(12) United States Patent
Abe et al.

(10) Patent No.: US 10,427,466 B2
(45) Date of Patent: Oct. 1, 2019

(54) TIRE FOR WINTER

(71) Applicant: SUMITOMO RUBBER INDUSTRIES, LTD., Kobe-shi, Hyogo (JP)

(72) Inventors: Shotaro Abe, Kobe (JP); Kazuki Higashiura, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 537 days.

(21) Appl. No.: 15/039,998

(22) PCT Filed: Dec. 11, 2014

(86) PCT No.: PCT/JP2014/082850
§ 371 (c)(1),
(2) Date: May 27, 2016

(87) PCT Pub. No.: WO2015/093390
PCT Pub. Date: Jun. 25, 2015

(65) Prior Publication Data
US 2017/0021674 A1    Jan. 26, 2017

(30) Foreign Application Priority Data

Dec. 20, 2013  (JP) ................................. 2013/264235
Jul. 4, 2014   (JP) ................................. 2014-138946

(51) Int. Cl.
  *B60C 11/11*  (2006.01)
  *B60C 11/03*  (2006.01)
  (Continued)

(52) U.S. Cl.
CPC ........... *B60C 11/11* (2013.01); *B60C 11/0302* (2013.01); *B60C 11/0304* (2013.01);
(Continued)

(58) Field of Classification Search
CPC ......... B60C 11/0302; B60C 2011/0374; B60C 11/1236
See application file for complete search history.

(56) References Cited

U.S. PATENT DOCUMENTS 6,148,886 A * 11/2000 Takasugi ............. B60C 11/0302
                                                  152/209.2
D754,058 S  *  4/2016 Caron ......................... D12/534
(Continued)

FOREIGN PATENT DOCUMENTS

EP    2 202 096 A2   6/2010
EP    2 243 638 A1  10/2010
(Continued)

OTHER PUBLICATIONS

International Search Report issued in PCT/JP2014/082850 dated Feb. 24, 2015.
(Continued)

*Primary Examiner* — Jodi C Franklin
(74) *Attorney, Agent, or Firm* — Birch, Stewart, Kolasch & Birch, LLP

(57) ABSTRACT

Provided is a tire for winter of which on-snow performance can be improved without compromising anti-wandering performance. A tire for winter comprises a tread part The tread part is provided with: a plurality of first inclined major grooves extending at an incline from one tread end beyond a tire equator and ending without reaching another tread end; first inclined minor grooves provided between the first inclined major grooves; a plurality of second inclined major grooves extending at an incline from the other tread end, in a direction opposite the first inclined major grooves, beyond the tire equator and ending without reaching the one tread end; second inclined minor grooves provided between the second inclined major grooves; a plurality of first longitu-
(Continued)

dinal grooves dividing first land parts; and a plurality of second longitudinal grooves dividing second land parts.

18 Claims, 5 Drawing Sheets

(51) Int. Cl.
  *B60C 11/13* (2006.01)
  *B60C 11/16* (2006.01)
  *B60C 11/12* (2006.01)
(52) U.S. Cl.
  CPC .......... *B60C 11/1236* (2013.01); *B60C 11/13* (2013.01); *B60C 11/1369* (2013.01); *B60C 11/16* (2013.01); *B60C 11/1625* (2013.01); *B60C 2011/0346* (2013.01); *B60C 2011/0358* (2013.01); *B60C 2011/0367* (2013.01); *B60C 2011/0374* (2013.01); *B60C 2011/1209* (2013.01)

(56) References Cited

U.S. PATENT DOCUMENTS

| | | | | |
|---|---|---|---|---|
| D773,978 S | * | 12/2016 | Higashiura | D12/563 |
| D778,230 S | * | 2/2017 | Haanketo | D12/564 |
| 2004/0118494 A1 | * | 6/2004 | Liederer | B60C 11/0318 152/209.3 |
| 2010/0132864 A1 | * | 6/2010 | Colombo | B60C 11/0302 152/209.8 |
| 2012/0312438 A1 | * | 12/2012 | Shinzawa | B60C 11/0302 152/209.8 |
| 2013/0068359 A1 | * | 3/2013 | Suita | B60C 11/01 152/209.16 |
| 2016/0243899 A1 | * | 8/2016 | Miyoshi | B60C 11/0302 |
| 2016/0297249 A1 | * | 10/2016 | Ishino | B60C 11/0302 |

FOREIGN PATENT DOCUMENTS

| | | | | |
|---|---|---|---|---|
| EP | 2 402 178 A1 | | 1/2012 | |
| EP | 2402178 A1 | * | 1/2012 | B60C 11/1625 |
| GB | 2 349 366 A | | 11/2000 | |
| JP | 01009008 A | * | 1/1989 | B60C 11/1281 |
| JP | 2000-264016 A | | 9/2000 | |
| JP | 2000-326707 A | | 11/2000 | |
| JP | 2006-298202 A | | 11/2006 | |
| JP | 2013-086651 A | | 5/2013 | |
| WO | WO 2010/098092 A1 | | 9/2010 | |
| WO | WO-2014115052 A1 | * | 7/2014 | B60C 11/0302 |
| WO | WO-2015059942 A1 | * | 4/2015 | B60C 11/0302 |

OTHER PUBLICATIONS

Written Opinion of the International Searching Authority issued in PCT/JP2014/082850 dated Feb. 24, 2015.

Extended European Search Report dated Jun. 21, 2017, in European Patent Application No. 14872141.8.

* cited by examiner

TIRE FOR WINTER

TECHNICAL FIELD

The present invention relates to a tire for winter having an excellent on-snow performance.

BACKGROUND ART

Patent Document 1 has proposed a tire for winter that includes a tread portion provided with a plurality of longitudinal grooves continuously extending in a straight manner in a circumferential direction of the tire and a plurality of lateral grooves traversing land portions between the longitudinal grooves to improve on-snow performance.

Snowy road surfaces tend to have protrusions formed and extended in a driving direction by pectinate snow compactor blades in road maintenance vehicles. When a vehicle with the tires for winter drives on such snowy roads, the longitudinal grooves in the tires engage with the protrusions and a wandering phenomenon is likely to occur such that the vehicle is led along the protrusions.

CITATION LIST

Patent Literature

Patent Document 1: Japanese Unexamined Patent Application Publication No. 2006-298202

SUMMARY OF INVENTION

Technical Problem

The present invention has been made in view of the foregoing problem. A major object of the present invention is to provide a tire for winter that improves on-snow performance without deteriorating wandering-proof performance.

Solution to Problem

The present invention provides a tire for winter including a tread portion being provided with a plurality of first main inclined grooves extending obliquely from a first tread edge toward a tire equator and terminating beyond the tire equator without reaching a second tread edge, a first sub inclined groove provided between the first main inclined grooves, the first sub inclined groove extending obliquely from the first tread edge toward the tire equator in the same direction as the first main inclined grooves and terminating not beyond the tire equator, a plurality of second main inclined grooves extending obliquely from the second tread edge toward the tire equator in an opposite direction to the first main inclined grooves and terminating beyond the tire equator without reaching the first tread edge, a second sub inclined groove provided between the second main inclined grooves, the second sub inclined groove extending obliquely from the second tread edge toward the tire equator in the same direction as the second main inclined grooves and terminates not beyond the tire equator, a plurality of first longitudinal grooves dividing first land portions formed between the first main inclined grooves and inclining in the same direction as the first main inclined grooves, and a plurality of second longitudinal grooves dividing second land portions formed between the second main inclined grooves and inclining in the same direction as the second main inclined grooves.

In the tire for winter according to the present invention, preferably, the first main inclined grooves have first inner ends that terminate in communication with the second main inclined grooves, the second main inclined grooves have second inner ends that terminate in communication with the first main inclined grooves, and the first main inclined grooves and the second main inclined grooves are alternately provided in a circumferential direction of the tire.

In the tire for winter according to the present invention, preferably, the first main inclined grooves and the second main inclined grooves are configured as an arc shape in which an inclination angle relative to an axial direction of the tire decreases gradually toward the first tread edge and the second tread edge respectively.

In the tire for winter according to the present invention, preferably, the first longitudinal grooves adjacent through the first main inclined grooves communicate with the first main inclined grooves at different positions in the axial direction of the tire.

In the tire for winter according to the present invention, preferably, the first longitudinal grooves include inner first longitudinal grooves and outer first longitudinal grooves disposed axially outward of the inner first longitudinal grooves.

In the tire for winter according to the present invention, preferably, the first sub inclined grooves terminate on the side of the tire equator beyond the inner first longitudinal groove.

In the tire for winter according to the present invention, preferably, the second longitudinal grooves adjacent through the second main inclined grooves communicate with the second main inclined grooves at different positions in the axial direction of the tire.

In the tire for winter according to the present invention, preferably, the second longitudinal grooves include inner second longitudinal grooves and outer second longitudinal grooves disposed axially outward of the inner second longitudinal grooves.

In the tire for winter according to the present invention, preferably, the second sub inclined grooves terminate on the side of the tire equator beyond the inner second longitudinal grooves.

In the tire for winter according to the present invention, preferably, the tread portion includes a plurality of grooves and a plurality of blocks defined by the grooves, and at least one of the blocks is provided with a stud pin or a hole for a stud pin.

In the tire for winter according to the present invention, preferably, the blocks include a plurality of central blocks provided on the tire equator, and at least one of the central blocks is provided with the stud pin or the hole.

In the tire for winter according to the present invention, preferably, the central blocks have approximately triangular ground contact surfaces.

In the tire for winter according to the present invention, preferably, the blocks include a plurality of shoulder blocks provided on the sides nearest the tread edges, and the shoulder blocks adjacent in the circumferential direction of the tire are different width in the axial direction of the tire.

In the tire for winter according to the present invention, preferably, the shoulder blocks have an axial edge extending in a zigzag manner in the axial direction of the tire.

In the tire for winter according to the present invention, preferably, the first longitudinal grooves and the second longitudinal grooves have tie bars with bulging groove bottoms, and the stud pin or the hole is provided at only one of the blocks in a pair positioned on the both sides of the tie bars in the axial direction of the tire.

Advantageous Effects of Invention

A tire for winter of the present invention includes a tread portion provided with first main inclined grooves having a length of extending beyond a tire equator from a first tread edge and second main inclined grooves having a length of extending beyond the tire equator from a second tread edge. First sub inclined grooves having a length of extending without reaching the tire equator from the first tread edge are provided between the first main inclined grooves. Second sub inclined grooves having a length of extending without reaching the tire equator from the second tread edge are provided between the second main inclined grooves. These main inclined grooves and the sub inclined grooves break protrusions on the snowy road surface along the driving direction to improve wandering-proof performance.

The main inclined grooves and the sub inclined grooves generate a large snow-shearing force on snowy road and exert high traction performance on snow. In addition, the main inclined grooves and the sub inclined grooves also have tire circumferential components and provide a high lateral grip even during cornering and the like.

The tire for winter of the present invention further includes a plurality of first longitudinal grooves that divides first land portions formed between the first main inclined grooves and inclines in the same direction as the first main inclined grooves, and a plurality of second longitudinal grooves that divides second land portions formed between the second main inclined grooves and inclines in the same direction as the second main inclined grooves. These longitudinal grooves complement the tire circumferential components to further enhance the lateral grip. In addition, these longitudinal grooves divide the first land portions and the second land portions to facilitate the deformation of the land portions at the time of ground contact and prevent snow clogging in the main inclined grooves and the sub inclined grooves.

REFERENCE SIGNS LIST

Figure 1:
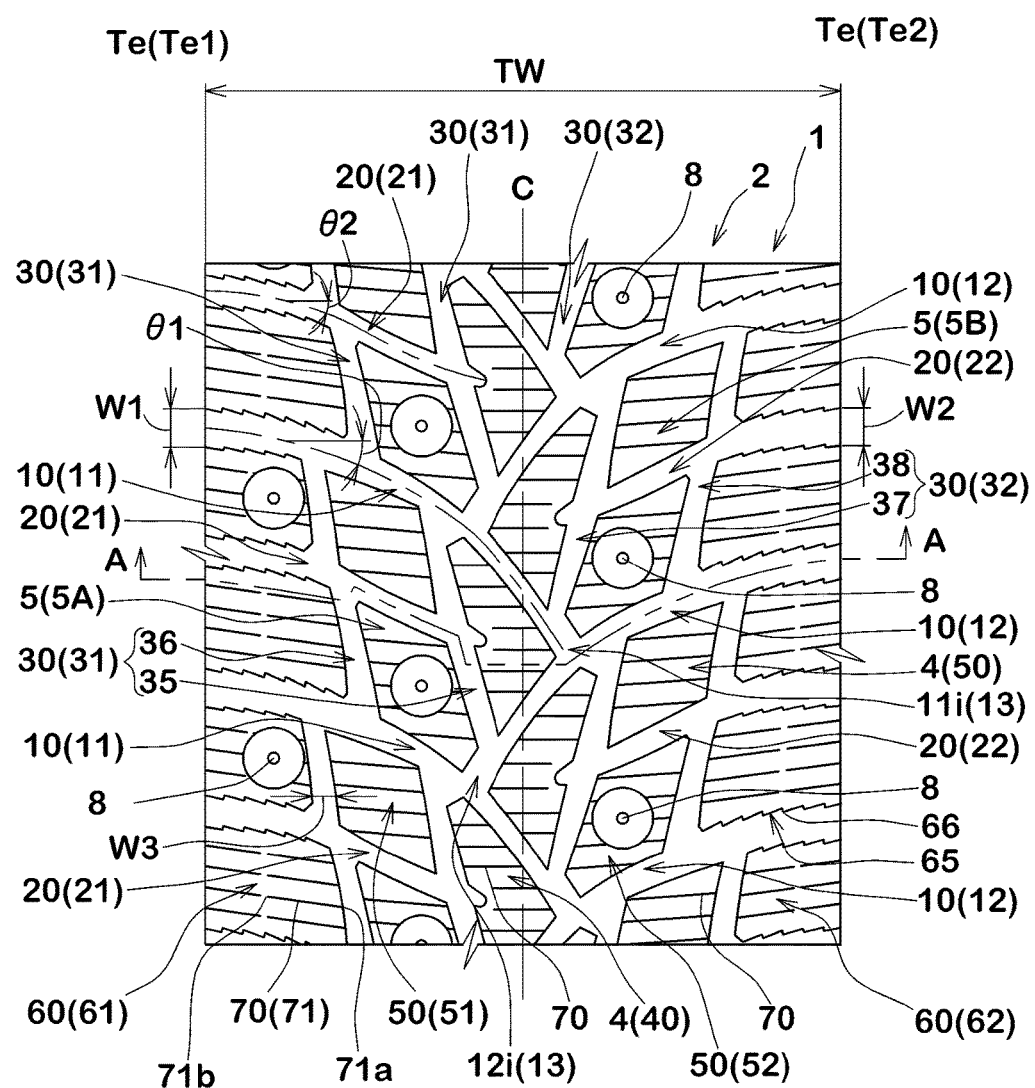
FIG. 1 is a development view of a tread portion of a tire for winter of an embodiment.

1 Tire for winter
2 Tread portion
5A First land portion
5B Second land portion
11 First main inclined groove
12 Second main inclined groove
21 First sub inclined groove
22 Second sub inclined groove
31 First longitudinal groove
32 Second longitudinal groove
Te1 First tread edge
Te2 Second tread edge

DESCRIPTION OF EMBODIMENTS

An embodiment of the present invention will be described below with reference to the drawings. FIG. 1 illustrates a tread portion 2 of a tire for winter (hereinafter, referred to as simply "tire") 1 of the embodiment. The tire 1 of the embodiment is preferably embodied as a tire for winter for passenger cars, for example.

As illustrated in FIG. 1, the tread portion 2 is provided with a plurality of main inclined grooves 10, sub inclined grooves 20 and longitudinal grooves 30.

The main inclined grooves 10 extend obliquely from tread edges Te toward a tire equator C and terminate beyond the tire equator C.

The tread edges Te are ground contact positions on the outermost side in a tire axial direction when the tire 1 in a normal state is placed under a normal load and brought into contact with the ground at a camber angle of 0 degrees. The normal state refers to a state in which the tire is mounted on a normal rim with a normal inner pressure but is loaded with no tire load. Unless otherwise noted herein, the dimensions of components of the tire are measured in the normal state.

The term "normal rim" is a rim specified for each tire by standards in a standard system including the standards for the tire. For example, the normal rim is the "standard rim" under JATMA, the "design rim" under TRA, and the "measuring rim" under ETRTO.

The term "normal inner pressure" refers to a pneumatic pressure specified for each tire by standards in a standard system including the standards for the tire. The "normal inner pressure" is the "maximum pneumatic pressure" under JATMA, the maximum value described in the table "Tire Load Limits at Various Cold Inflation Pressures" under TRA, and the "inflation pressure" under ETRTO.

The term "normal load" refers to a load specified for each tire by standards in a standard system including the standards for the tire. The "normal load" is the "maximum load performance" under JATMA, the maximum value described in the table "Tire Load Limits at Various Cold Inflation Pressures" under TRA, and the "load capacity" under ETRTO.

As illustrated in FIG. 1, the main inclined grooves 10 include first main inclined grooves 11 and second main inclined grooves 12.

The first main inclined grooves 11 extend from a first tread edge Te1, which is one of the tread edges, toward the tire equator C. The first main inclined grooves 11 extends beyond the tire equator C and terminate without reaching a second tread edge Te2, which is the other one of the tread edges.

The second main inclined grooves 12 extend from the second tread edge Te2 toward the tire equator C in an opposite direction to the first main inclined grooves 11. The second main inclined grooves 12 extend beyond the tire equator C and terminate without reaching the first tread edge Te1.

Since the main inclined grooves 10 traverse the tire equator C, large ground pressure acts on the main inclined grooves 10. Therefore, during driving on snowy roads, the snow in the grooves is strongly compressed to generate a large snow-shearing force. In addition, the main inclined grooves 10 produce an excellent edge effect to enhance on-ice performance. The main inclined grooves 10 extend obliquely from the tread edges Te toward the tire equator C, and can generate a frictional force in the axial direction of the tire to suppress sideslip on snow and ice.

Each of the sub inclined grooves 20 is provided between a pair of circumferentially adjacent main inclined grooves 10 and 10. The sub inclined grooves 20 extend obliquely from the tread edges Te toward the tire equator C and terminate not beyond the tire equator C.

As illustrated in FIG. 1, the sub inclined grooves 20 include first sub inclined grooves 21 and second sub inclined grooves 22.

Each of the first sub inclined grooves 21 is provided between a pair of circumferentially adjacent first main inclined grooves 11 and 11. The first sub inclined grooves 21 extend obliquely in the same direction as the first main inclined grooves 11 from the first tread edge Te1 toward the tire equator C.

Each of the second sub inclined grooves 22 is provided between a pair of circumferentially adjacent second main inclined grooves 12 and 12. The second sub inclined grooves 22 extend obliquely in the same direction as the second main inclined grooves 12 from the second tread edge Te2 toward the tire equator C.

The sub inclined grooves 20 do not traverse the tire equator C but maintain the rigidity of the blocks around the tire equator C to enhance on-snow performance and on-ice performance while maintaining driving stability on dry road surfaces.

The main inclined grooves 10 and the sub inclined grooves 20 may break protrusions formed on snowy road surface along the driving direction to improve wandering-proof performance. The main inclined grooves 10 and the sub inclined grooves 20 generate a large snow-shearing force and exert high traction performance on the snowy road. In addition, the main inclined grooves 10 and the sub inclined grooves 20 also have tire circumferential components and provide a high lateral grip even during cornering and the like.

In order to further enhance the foregoing effects, a groove width W1 of the main inclined grooves 10 and a groove width W2 of the sub inclined grooves 20 are preferably in a range of from 3.0% to 8.5% of a tread ground contact width TW, for example. The tread ground contact width TW is an axial distance between the first tread edges Te1 and the second tread edge Te2 in the normal state.

Figure 2:
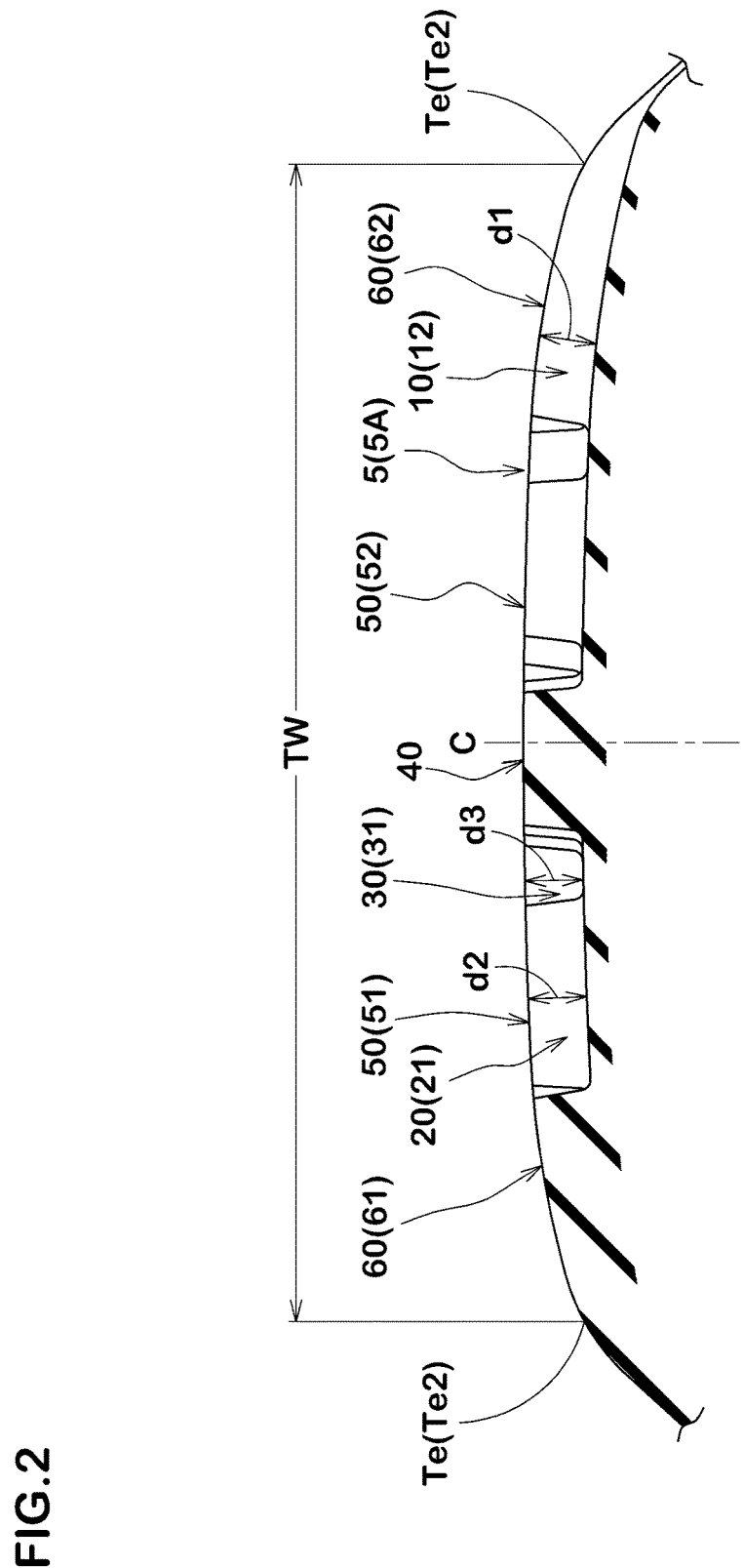
FIG. 2 is a cross-sectional view of FIG. 1 taken along a line A-A.

FIG. 2 is a cross-sectional view of FIG. 1 taken along a line A-A. As illustrated in FIG. 2, a groove depth d1 of the main inclined grooves 10 and a groove depth d2 of the sub inclined grooves 20 are preferably in a range of from 3.0 to 10.0 mm, for example.

As illustrated in FIG. 1, preferably, the first main inclined grooves 11 according to the embodiment have first inner ends 11i terminating in communication with the second main inclined grooves 12, for example. Preferably, the second main inclined grooves 12 according to the embodiment have second inner ends 12i terminating in communication with the first main inclined grooves 11, for example. Accordingly, connection portions 13 between the first main inclined grooves 11 and the second main inclined grooves 12 break effectively protrusions formed on the snowy road surface to obtain a large snow-shearing force. In addition, large snow columns are likely to be formed at the connection portions 13, thereby achieving excellent on-snow performance.

The first main inclined grooves 11 and the second main inclined grooves 12 are preferably arranged alternately in the circumferential direction of the tire, for example. This suppresses effectively uneven wear of the tread portion 2.

The main inclined grooves 10 according to the embodiment are preferably formed in an arc shape in which an inclination angle θ1 relative to the axial direction of the tire gradually decreases toward the tread edges Te. The main inclined grooves 10 maintain the rigidity around the tire equator C in the circumferential direction of the tire on which a large ground pressure acts, and moderate the rigidity of the land portions around the tread edges Te in the circumferential direction of the tire. Therefore, it is possible to maintain driving stability and enhance wandering-proof performance. In addition, the main inclined grooves 10 exert a frictional force multidirectionally to enhance on-ice driving stability in particular.

The inclination angle θ1 of the main inclined grooves 10 is preferably 35 degrees or more, more preferably 40 degrees or more, and is preferably 50 degrees or less, more preferably 45 degrees or less. The main inclined grooves 10 ensure balanced compatibility between stable driving performance and wandering-proof performance.

From the same viewpoint, an inclination angle θ2 of the sub inclined grooves 20 is preferably 20 degrees or more, more preferably 25 degrees or more, and is preferably 35 degrees or less, more preferably 30 degrees or less.

The main inclined grooves 10 and the sub inclined grooves 20 are approximately parallel to the axial direction of the tire at the tread edges Te. Accordingly, during driving on a snowy road, the protrusions on the snowy road surface can be effectively broken to suppress a wandering phenomenon.

The longitudinal grooves 30 divide land portions 5 formed between the main inclined grooves 10 and 10 and extend in the circumferential direction of the tire. The longitudinal grooves 30 incline in the same direction as the main inclined grooves 10 adjacent in the circumferential direction of the tire.

The longitudinal grooves 30 include first longitudinal grooves 31 and second longitudinal grooves 32.

The first longitudinal grooves 31 divide first land portions 5A formed between the first main inclined grooves 11 and 11. The first longitudinal grooves 31 incline in the same direction as the first main inclined grooves 11.

The second longitudinal grooves 32 divide second land portions 5B formed between the second main inclined grooves 12 and 12. The second longitudinal grooves 32 incline in the same direction as the second main inclined grooves 12.

The longitudinal grooves 30 can complement the tire circumferential components to further enhance the lateral grip. In addition, the longitudinal grooves 30 divide the first land portions 5A and the second land portions 5B to facilitate the deformation of the land portions at the time of ground contact and prevent snow clogging in the main inclined grooves 10 and the sub inclined grooves 20.

In order to obtain a large snow column shearing force while suppressing snow clogging, a groove width W3 of the longitudinal grooves 30 is desirably 2.5% to 8.0% of the tread ground contact width TW, for example. Otherwise, the groove width W3 of the longitudinal grooves 30 is preferably 5 mm or more, more preferably 8 mm or more, and is preferably 14 mm or less, more preferably 11 mm or less. A groove depth d3 of the longitudinal grooves 30 (illustrated in FIG. 2) is desirably 3.0 to 10.0 mm, for example.

As illustrated in FIG. 1, the tread portion 2 according to the embodiment has no main grooves continuously extending over the circumference of the tire 1 in the circumferential direction of the tire. Accordingly, the tire 1 according to the embodiment exerts excellent wandering-proof performance without being led by protrusions formed on snowy road surface in the driving direction. In addition, the tread portion 2 allows uniform arrangement of stud pins in the axial direction of the tire to exert excellent on-ice performance.

In the embodiment, the longitudinal grooves 30 adjacent in the circumferential direction of the tire are provided such that at least their tire circumferential end portions are shifted in position from each other in the axial direction of the tire.

Specifically, the first longitudinal grooves 31 adjacent through the first main inclined grooves 11 communicate with the first main inclined grooves 11 at different positions in the axial direction of the tire, for example. The second longitudinal grooves 32 adjacent through the second main inclined grooves 12 communicate with the second main inclined grooves 12 at different positions in the axial direction of the tire, for example.

The first longitudinal grooves 31 formed in the first land portions 5A include inner first longitudinal grooves 35 and outer first longitudinal grooves 36.

The inner first longitudinal grooves 35 are disposed on the side of the tire equator C. One ends of the inner first longitudinal grooves 35 communicate with the first main inclined grooves 11, and the other ends of the inner first longitudinal grooves 35 communicate with the second main inclined grooves 12 adjacent in the axial direction of the tire.

The outer first longitudinal grooves 36 are disposed on the outside of the inner first longitudinal grooves 35 in the axial direction of the tire. The outer first longitudinal grooves 36 communicate between the first main inclined grooves 11 and 11 adjacent in the circumferential direction of the tire.

The second longitudinal grooves 32 include inner second longitudinal grooves 37 and outer second longitudinal grooves 38.

The inner second longitudinal grooves 37 are disposed on the side of the tire equator C. One ends of the inner second longitudinal grooves 37 communicate with the second main inclined grooves 12, and the other ends of the inner second longitudinal grooves 37 communicate with the first main inclined grooves 11 adjacent in the axial direction of the tire.

The outer second longitudinal grooves 38 are disposed on the outside of the inner second longitudinal grooves 37 in the axial direction of the tire. The outer second longitudinal grooves 38 communicate between the second main inclined grooves 12 and 12 adjacent in the circumferential direction of the tire.

In the tire 1 with the first longitudinal grooves 31 and the second longitudinal grooves 32, even when the longitudinal grooves 30 engage with protrusions extending in the driving direction on snowy road surface during driving on the road, the main inclined grooves 10 or the sub inclined grooves 20 break protrusions before the vehicle is led along protrusions. Therefore, it is possible to suppress effectively a wandering phenomenon. In addition, the first longitudinal grooves 31 and the second longitudinal grooves 32 further facilitate the deformation of the land portions at the time of ground contact and prevent snow clogging in the main inclined grooves 10 and the sub inclined grooves 20.

Figure 3:
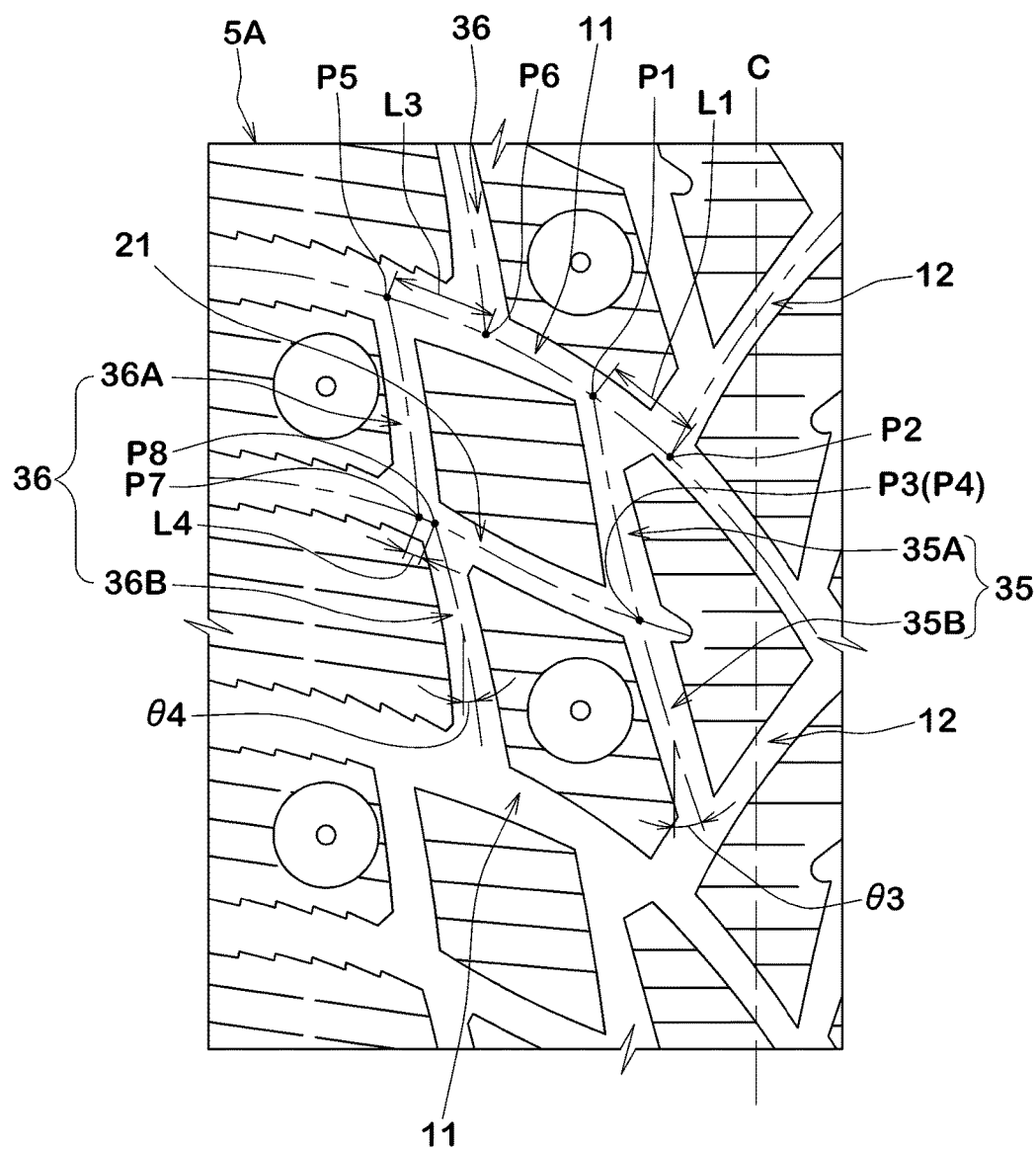
FIG. 3 is an enlarged view of a first land portion illustrated in FIG. 1.

FIG. 3 is an enlarged view of the first land portion 5A. As illustrated in FIG. 3, an inclination angle θ3 of the inner first longitudinal grooves 35 in the circumferential direction of the tire and an inclination angle θ4 of the outer first longitudinal grooves 36 in the circumferential direction of the tire are preferably 5 degrees or more, more preferably 10 degrees or more, and is preferably 20 degrees or less, more preferably 15 degrees or less. The inner first longitudinal grooves 35 and the outer first longitudinal grooves 36 provide a strong lateral grip and discharge effectively the snow from the grooves during driving on snowy roads.

An intersection point P1 between the inner first longitudinal groove 35 and the first main inclined groove 11 is desirably positioned on the outer side in the axial direction of the tire than an intersection point P2 between the first main inclined groove 11 and the second main inclined groove 12. A distance L1 between the intersection point P1 and the intersection point P2 is preferably 15 mm or more, more preferably 18 mm or more, and is preferably 25 mm or less, more preferably 22 mm or less. Accordingly, it is possible to form large snow columns in the grooves while suppressing a wandering phenomenon, thereby achieving improvement of on-snow performance.

The inner first longitudinal grooves 35 intersect the first sub inclined grooves 21. Accordingly, the first sub inclined grooves 21 terminate beyond the inner first longitudinal grooves 35 on the tire equator C side. The inner first longitudinal grooves 35 include first portions 35A and second portions 35B sectioned by the first sub inclined grooves 21.

The first portions 35A of the inner first longitudinal grooves 35 communicate between the first main inclined grooves 11 and the first sub inclined grooves 21. The second portions 35B of the inner first longitudinal grooves 35 communicate between the second main inclined grooves 12 and the first sub inclined grooves 21.

The inner first longitudinal grooves 35 of the embodiment have the first portions 35A and the second portions 35B made continuous smoothly. The inner first longitudinal grooves 35 form large snow columns in the grooves to enhance effectively on-snow performance. In addition, the inner first longitudinal grooves 35 also enhance drainage performance during driving on wet roads.

The first portions 35A and the second portions 35B of the inner first longitudinal grooves 35 may be shifted in position from each other in the axial direction of the tire, for example. In this case, a distance L2 (not illustrated) between an intersection point P3 between the first portion 35A of the first longitudinal groove 35 and the first sub inclined groove 21 and an intersection point P4 between the second portion 35B of the first longitudinal groove 35 and the first sub inclined groove 21 is preferably 5 mm or more, more preferably 8 mm or more, and is preferably 15 mm or less, more preferably 12 mm or less. The inner first longitudinal grooves 35 further enhance wandering-proof performance. In addition, the inner first longitudinal grooves 35 form large snow columns between the intersection point P3 and the intersection point P4 to further enhance on-snow performance.

The intersection point P5 between the outer first longitudinal groove 36 and the first main inclined groove 11 and the intersection point P6 between the outer first longitudinal groove 36 and the first main inclined groove 11 adjacent in the circumferential direction of the tire are desirably shifted in position from each other in the axial direction of the tire. A distance L3 between the intersection point P5 and the intersection point P6 is preferably 20 mm or more, more preferably 23 mm or more, and is preferably 30 mm or less, more preferably 27 mm or less. Accordingly, it is possible to form large snow columns between the intersection point P5 and the intersection point P6 while suppressing a wandering phenomenon, thereby achieving improvement of on-snow performance.

The outer first longitudinal grooves 36 intersect the first sub inclined grooves 21, for example. Accordingly, the outer first longitudinal grooves 36 include first portions 36A and second portions 36B sectioned by the first sub inclined grooves 21.

The first portions 36A and the second portions 36B of the outer first longitudinal grooves 36 are desirably shifted in position from each other in the axial direction of the tire. A distance L4 between an intersection point P7 between the first portion 36A of the outer first longitudinal groove 36 and the first sub inclined groove 21 and an intersection point P8 between the second portion 36B of the outer first longitudinal groove 36 and the first sub inclined groove 21 is preferably 10 mm or more, more preferably 13 mm or more, and is preferably 20 mm or less, more preferably 17 mm or less. Accordingly, it is possible to form large snow columns between the portions of intersection between the outer first longitudinal grooves 36 and the first sub inclined grooves 21, thereby exerting excellent on-snow performance As illustrated in FIG. 1, the inner second longitudinal grooves 37 and the outer second longitudinal grooves 38 are substantially line-symmetrical in shape to the inner first longitudinal grooves 35 and the outer first longitudinal grooves 36 with respect to the tire equator C. Therefore, the components of the inner first longitudinal grooves 35 and the outer first longitudinal grooves 36 are also included in the inner second longitudinal grooves 37 and the outer second longitudinal grooves 38. The inner second longitudinal grooves 37 and the outer second longitudinal grooves 38, and the inner first longitudinal grooves 35 and the outer first longitudinal grooves 36 are separated from each other with a phase difference of half pitch in the circumferential direction of the tire.

The tread portion 2 has a plurality of blocks 4 formed by the plurality of grooves described above. At least one of the blocks 4 has stud pins or stud pin holes 8. In the embodiment, the stud pins or the stud pin holes 8 are arranged at random on the respective blocks. The stud pins enhance effectively on-ice performance. The accompanying drawings do not illustrate the stud pins.

A plurality of sipes 70 extending in the axial direction of the tire is arranged on the respective blocks of the embodiment. The sipes 70 exert an excellent edge effect and enhance effectively on-ice performance. The term "sipes" herein refer to grooves with a width of less than 1.0 mm.

Figure 4:
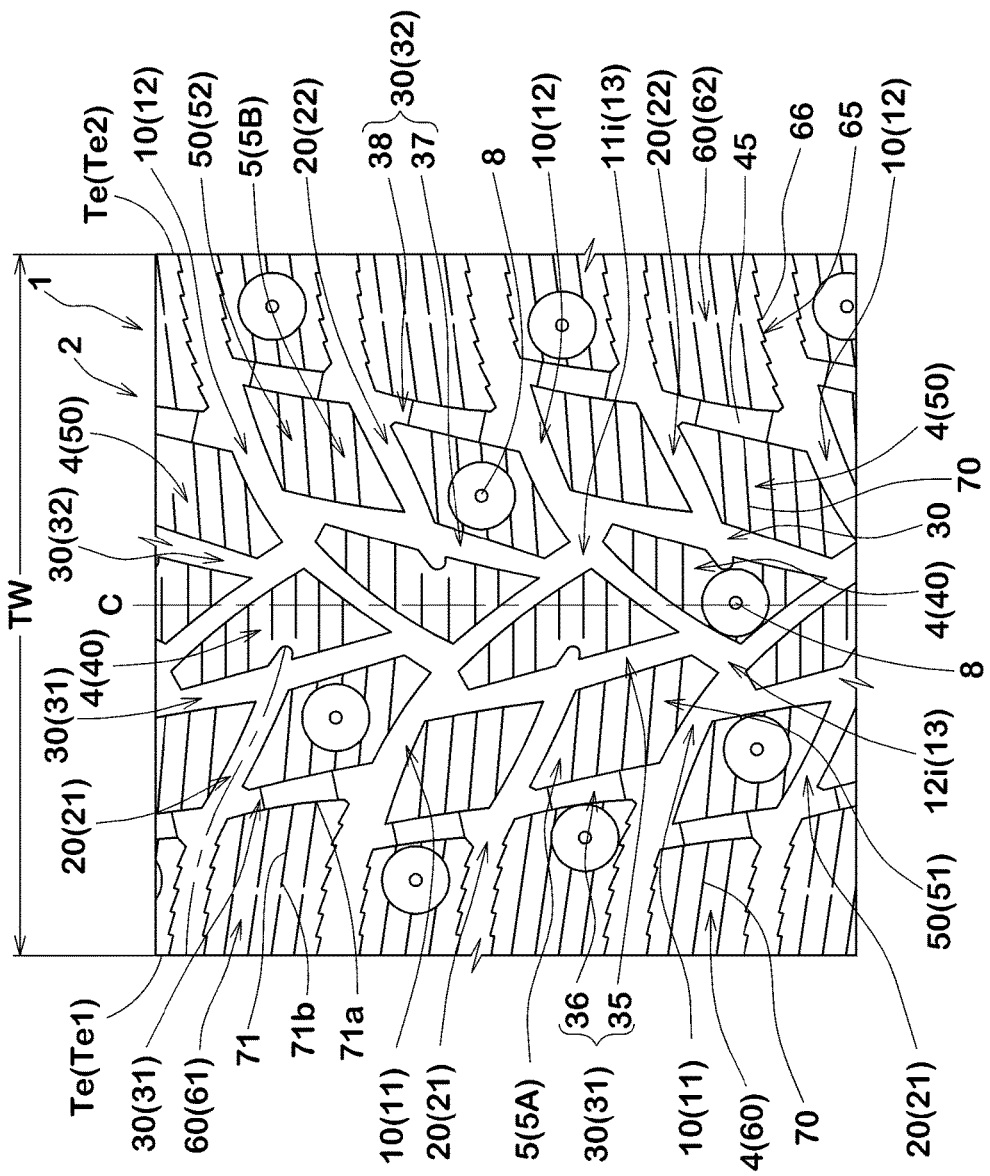
FIG. 4 is a development view of a tread portion of a tire for winter of another embodiment.

FIG. 4 is an enlarged view of the tread portion 2 of the tire for winter 1 of another embodiment of the present invention. As illustrated in FIG. 4, when the tread portion 2 is provided with the foregoing grooves, pluralities of central blocks 40, middle blocks 50, and shoulder blocks 60 are provided in the circumferential direction of the tire.

The central blocks 40 are formed by the first main inclined grooves 11, the second main inclined grooves 12, and the inner first longitudinal grooves 35 or the inner second longitudinal grooves 37. The central blocks 40 have approximately triangular tread surfaces, for example.

At least one of the central blocks 40 has desirably stud pins or stud pin holes 8. Since large ground pressure acts on the central blocks 41, the central blocks 40 have the stud pins to enhance effectively on-ice performance.

As illustrated in FIG. 4, the plurality of middle blocks 50 is provided in the circumferential direction of the tire. The middle blocks 50 are shifted in position from each other in the axial direction of the tire. When the stud pins are provided, the middle blocks 50 can be shifted in position in the axial direction of the tire to enhance effectively on-ice performance.

The middle blocks 50 include first middle blocks 51 and second middle blocks 52. The first middle blocks 51 are arranged in the first land portions 5A and are sectioned by the first main inclined grooves 11, the first sub inclined grooves 21, the inner first longitudinal grooves 35, and the outer first longitudinal grooves 36. The second middle blocks 52 are arranged in the second land portions 5B and are sectioned by the second main inclined grooves 12, the second sub inclined grooves 22, the inner second longitudinal grooves 37, and the outer second longitudinal grooves 38. The middle blocks 50 have approximately parallelogramic tread surfaces, for example.

The shoulder blocks 60 include first shoulder blocks 61 and second shoulder blocks 62.

The first shoulder blocks 61 are arranged in the first land portions 5A and are sectioned by the first main inclined grooves 11, the first sub inclined grooves 21, and the outer first longitudinal grooves 36. The second shoulder blocks 62 are arranged in the second land portions 5B and are sectioned by the second main inclined grooves 12, the second sub inclined grooves 22, and the outer second longitudinal grooves 38. The shoulder blocks 60 have approximately rectangular tread surfaces, for example.

The shoulder blocks 60 adjacent in the circumferential direction of the tire are desirably different in tire axial width. The shoulder blocks 60 are different in the amount of deformation at the time of contact with the ground, and therefore further prevent snow clogging in the main inclined grooves 10 and the sub inclined grooves 20.

The shoulder blocks 60 have desirably zigzag edges 65 extending in a zigzag manner in the axial direction of the tire, for example. The zigzag edges 65 have a plurality of small projections 66 as convex corners in the circumferential direction of the tire, for example. The zigzag edge 65 of the present embodiment has, for example, 4 to 7 small projections 66. The zigzag edges 65 eat effectively into the road surface to exert excellent wandering-proof performance.

The shoulder blocks 60 desirably have semi-open sipes 71 with first ends 71a that communicate with the grooves and second ends 71b terminating within the blocks. Accordingly, the rigidity of the shoulder blocks 60 is maintained to improve driving stability.

The longitudinal grooves 30 between the shoulder blocks 60 and the middle blocks 50 have desirably tie bars 45 with bulging groove bottoms. The tie bars 45 suppress the deformation of the shoulder blocks 60 and the middle blocks 50 in the axial direction of the tire to enhance on-ice driving stability.

The stud pins or the stud pin holes 8 are desirably provided in only one of the shoulder blocks 60 and the middle blocks 50 in pairs on the both ends of the tie bar 45 in the axial direction of the tire. Accordingly, the blocks without stud pins deform relatively largely to suppress snow clogging in the grooves. In addition, the blocks with the stud pins suppress effectively excessive falling of the blocks adjacent via the tie bars. Therefore, on-snow performance and on-ice performance can be enhanced in a balanced manner.

In the tire for winter of the embodiment, a land ratio Lr of the tread portion 2 is preferably 55% or more, more preferably 60% or more, and is preferably 70% or less, more preferably 65% or less. This ensures compatibility between driving stability and on-snow performance. The term "land ratio" herein refers to ratio Sb/Sa of actual ground-contact area Sb to entire area Sa of a virtual ground-contact surface in which all the grooves and the sipes are filled between the tread edges Te and Te.

The tread portion 2 is desirably formed from tread rubber with a JIS-A hardness of 45 to 65 degrees. The tread rubber maintains flexibility even on low temperature snowy road surfaces, and exerts excellent on-snow performance. The term JIS-A hardness herein refers to a durometer type-A hardness of rubber measured at 23 degrees C. environments in compliance with JIS-K6253.

The tire for winter of the present invention has been described in detail so far. As a course of matter, however, the present invention is not limited to the illustrated embodiment but can be modified in various manners.

EXAMPLES

The tire for winter for automobile with a size of 205/60R16 having the basic pattern illustrated in FIG. 1 was prototyped in accordance with the specifications in Table 1. As comparative example 1, a tire including only main grooves extending continuously over the circumference of the tire and lateral grooves extending in the axial direction of the tire was prototyped. These test tires were tested for on-snow performance and wandering-proof performance. The common specifications and test method for the test tires were as follows:

Mounting rim: 16×6.5
Tire internal pressure: 240 kPa for front wheels and 220 kPa for rear wheels
Test vehicle: Front-wheel-drive vehicle with a displacement of 2000 cc
Tire mounting position: All the wheels On-Snow Performance:

The test vehicle with the test tires were tested for on-snow driving performance by the driver's sensory evaluation. The larger values of test results indicate more excellence in on-snow performance with a score of 100 representing the values of the comparative example 1.

Wandering-Proof Performance:

The test vehicle with the test tires was driven on an icy and snowy road surface with protrusions extending in the driving direction. The test vehicle was tested for behaviors such as shaking or the like by the driver's sensory evaluation. The larger values of test results indicate more excellence in wandering-proof performance with a score of 100 representing the values of the comparative example 1.

Table 1 shows the test results.

TABLE 1

|  | Comp. Ex. 1 | Example 1 | Example 2 | Example 3 | Example 4 | Example 5 | Example 6 | Example 7 | Example 8 |
|---|---|---|---|---|---|---|---|---|---|
| Distance L1 between intersection point P1 and intersection point P2 (mm) | — | 20.0 | 20.0 | 20.0 | 20.0 | 20.0 | 20.0 | 20.0 | 20.0 |
| Distance L2 between intersection point P3 and intersection point P4 (mm) | — | 10.0 | 10.0 | 10.0 | 10.0 | 10.0 | 10.0 | 30.0 | 10.0 |
| Distance L3 between intersection point P5 and intersection point P6 (mm) | — | 20.0 | 20.0 | 20.0 | 20.0 | 20.0 | 20.0 | 20.0 | 25.0 |
| Distance L4 between intersection point P7 and intersection point P8 (mm) | — | 10.0 | 10.0 | 10.0 | 10.0 | 10.0 | 10.0 | 30.0 | 15.0 |
| Inclination angle $\theta 1$ of main inclined grooves (deg.) | — | 45.0 | 60.0 | 75.0 | 40.0 | 45.0 | 40.0 | 40.0 | 40.0 |
| Inclination angle $\theta 2$ of sub inclined grooves (deg.) | — | 30.0 | 60.0 | 60.0 | 25.0 | 30.0 | 25.0 | 25.0 | 25.0 |
| Inclination angle $\theta 3$ of inner first vertical grooves (deg.) | — | 15.0 | 15.0 | 15.0 | 45.0 | 45.0 | 15.0 | 10.0 | 10.0 |
| Inclination angle $\theta 4$ of outer first vertical grooves (deg.) | — | 15.0 | 15.0 | 15.0 | 60.0 | 45.0 | 15.0 | 15.0 | 15.0 |
| On-snow performance (score) | 100 | 108 | 107 | 104 | 106 | 108 | 108 | 104 | 110 |
| Wandering-proof performance (score) | 100 | 107 | 108 | 106 | 104 | 106 | 109 | 108 | 110 |

|  | Example 9 | Example 10 | Example 11 | Example 12 | Example 13 | Example 14 | Example 15 | Example 16 | Example 17 | Example 18 |
|---|---|---|---|---|---|---|---|---|---|---|
| Distance L1 between intersection point P1 and intersection point P2 (mm) | 20.0 | 20.0 | 15.0 | 25.0 | 20.0 | 20.0 | 20.0 | 20.0 | 30.0 | 25.0 |
| Distance L2 between intersection point P3 and intersection point P4 (mm) | 10.0 | 10.0 | 10.0 | 10.0 | 10.0 | 10.0 | 5.0 | 15.0 | 10.0 | 15.0 |
| Distance L3 between intersection point P5 and intersection point P6 (mm) | 20.0 | 30.0 | 25.0 | 25.0 | 25.0 | 25.0 | 25.0 | 25.0 | 35.0 | 25.0 |
| Distance L4 between intersection point P7 and intersection point P8 (mm) | 15.0 | 15.0 | 15.0 | 15.0 | 10.0 | 20.0 | 15.0 | 15.0 | 15.0 | 15.0 |
| Inclination angle $\theta 1$ of main inclined grooves (deg.) | 40.0 | 40.0 | 40.0 | 40.0 | 40.0 | 40.0 | 40.0 | 40.0 | 40.0 | 45.0 |
| Inclination angle $\theta 2$ of sub inclined grooves (deg.) | 25.0 | 25.0 | 25.0 | 25.0 | 25.0 | 25.0 | 25.0 | 25.0 | 25.0 | 30.0 |
| Inclination angle $\theta 3$ of inner first vertical grooves (deg.) | 10.0 | 10.0 | 10.0 | 10.0 | 10.0 | 10.0 | 10.0 | 10.0 | 10.0 | 15.0 |
| Inclination angle $\theta 4$ of outer first vertical grooves (deg.) | 15.0 | 15.0 | 15.0 | 15.0 | 15.0 | 15.0 | 15.0 | 15.0 | 15.0 | 15.0 |
| On-snow performance (score) | 111 | 109 | 111 | 109 | 110 | 109 | 111 | 109 | 105 | 107 |
| Wandering-proof performance (score) | 109 | 111 | 109 | 111 | 109 | 110 | 109 | 111 | 108 | 109 |

TABLE 1-continued

|  | Example 19 | Example 20 | Example 21 | Example 22 | Example 23 | Example 24 | Example 25 | Example 26 | Example 27 | Example 28 |
|---|---|---|---|---|---|---|---|---|---|---|
| Distance L1 between intersection point P1 and intersection point P2 (mm) | 25.0 | 25.0 | 5.0 | 5.0 | 5.0 | 5.0 | 0.0 | 0.0 | 0.0 | 0.0 |
| Distance L2 between intersection point P3 and intersection point P4 (mm) | 25.0 | 15.0 | 5.0 | 5.0 | 5.0 | 5.0 | 0.0 | 0.0 | 0.0 | 0.0 |
| Distance L3 between intersection point P5 and intersection point P6 (mm) | 25.0 | 25.0 | 0.0 | 0.0 | 0.0 | 0.0 | 5.0 | 0.0 | 0.0 | 0.0 |
| Distance L4 between intersection point P7 and intersection point P8 (mm) | 25.0 | 15.0 | 0.0 | 0.0 | 0.0 | 0.0 | 5.0 | 0.0 | 0.0 | 0.0 |
| Inclination angle θ1 of main inclined grooves (deg.) | 45.0 | 45.0 | 45.0 | 30.0 | 70.0 | 45.0 | 45.0 | 45.0 | 30.0 | 70.0 |
| Inclination angle θ2 of sub inclined grooves (deg.) | 30.0 | 30.0 | 30.0 | 15.0 | 65.0 | 30.0 | 30.0 | 30.0 | 15.0 | 65.0 |
| Inclination angle θ3 of inner first vertical grooves (deg.) | 15.0 | 10.0 | 15.0 | 15.0 | 15.0 | 15.0 | 0.0 | 0.0 | 0.0 | 0.0 |
| Inclination angle θ4 of outer first vertical grooves (deg.) | 15.0 | 10.0 | 0.0 | 0.0 | 0.0 | 0.0 | 15.0 | 0.0 | 0.0 | 0.0 |
| On-snow performance (score) | 106 | 109 | 106 | 107 | 104 | 106 | 107 | 107 | 108 | 106 |
| Wandering-proof performance (score) | 110 | 109 | 105 | 105 | 105 | 105 | 105 | 104 | 104 | 104 |

As seen from Table 1, it has been revealed that the tire for winter of the example improved on-snow performance without sacrificing wandering-proof performance.

Figure 5:
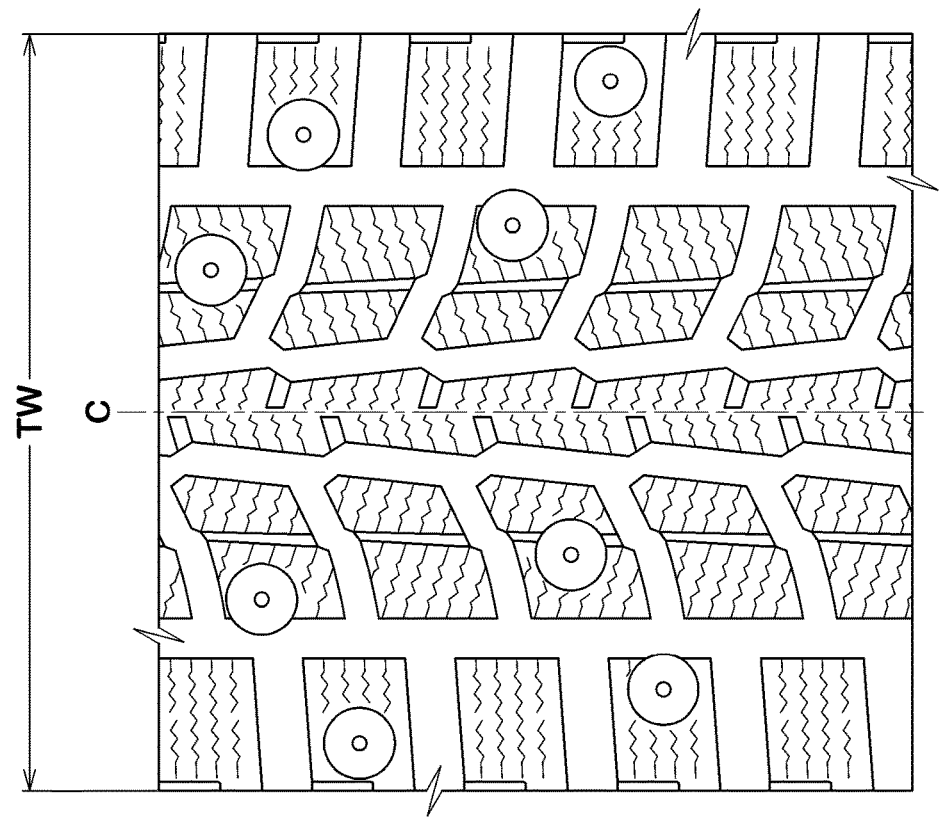
FIG. 5 is a development view of a tread portion of a tire for winter of a comparative example.

The tire for winter for automobile with a size of 205/60R16 having the basic pattern illustrated in FIG. 4 was prototyped in accordance with the specifications in Table 1. As a comparative example 2, a tire having the tread pattern illustrated in FIG. 5 was prototyped. These test tires were tested for on-snow performance and on-ice performance. The common specifications and test method for the test tires were as follows:

Mounting rim: 16×6.5

Tire internal pressure: 240 kPa for front wheels and 220 kPa for rear wheels

Test vehicle: Front-wheel-drive vehicle with a displacement of 2000 cc

Tire mounting position: All the wheels

On-Snow Performance and on-Ice Performance:

The test vehicle with the test tires was tested for on-snow and on-ice driving performance by the driver's sensory evaluation. The larger values of test results indicate more excellence in on-snow performance or on-ice performance with a score of 100 representing the values of the comparative example 1.

Table 2 shows the test results.

TABLE 2

|  | Comp. Ex. 2 | Example 29 | Example 30 | Example 31 | Example 32 | Example 33 | Example 34 | Example 35 | Example 36 |
|---|---|---|---|---|---|---|---|---|---|
| Distance L1 between intersection point P1 and intersection point P2 (mm) | — | 20.0 | 15.0 | 25.0 | 30.0 | 35.0 | 25.0 | 20.0 | 20.0 |
| Distance L2 between intersection point P3 and intersection point P4 (mm) | — | 10.0 | 10.0 | 10.0 | 10.0 | 10.0 | 25.0 | 10.0 | 10.0 |
| Distance L3 between intersection point P5 and intersection point P6 (mm) | — | 25.0 | 15.0 | 25.0 | 25.0 | 35.0 | 25.0 | 25.0 | 25.0 |
| Distance L4 between intersection point P7 and intersection point P8 (mm) | — | 15.0 | 15.0 | 15.0 | 15.0 | 15.0 | 25.0 | 15.0 | 15.0 |
| Inclination angle θ1 of main inclined grooves (deg.) | — | 40.0 | 40.0 | 40.0 | 40.0 | 40.0 | 40.0 | 30.0 | 45.0 |
| Inclination angle θ2 of sub inclined grooves (deg.) | — | 25.0 | 25.0 | 25.0 | 25.0 | 25.0 | 25.0 | 15.0 | 30.0 |
| Inclination angle θ3 of inner first vertical grooves (deg.) | — | 10.0 | 10.0 | 10.0 | 10.0 | 10.0 | 10.0 | 10.0 | 10.0 |
| Inclination angle θ4 of outer first vertical grooves (deg.) | — | 15.0 | 15.0 | 15.0 | 15.0 | 15.0 | 15.0 | 15.0 | 15.0 |
| The presence or absence of tie bars between shoulder blocks and middle blocks | — | Present | Present | Present | Present | Present | Present | Present | Present |
| On-snow performance (score) | 100 | 108 | 106 | 107 | 107 | 106 | 107 | 108 | 107 |
| On-ice performance (score) | 100 | 104 | 105 | 104 | 103 | 103 | 103 | 103 | 104 |

TABLE 2-continued

|  | Example 37 | Example 38 | Example 39 | Example 40 | Example 41 | Example 42 | Example 43 | Example 44 | Example 45 |
|---|---|---|---|---|---|---|---|---|---|
| Distance L1 between intersection point P1 and intersection point P2 (mm) | 20.0 | 20.0 | 20.0 | 20.0 | 20.0 | 20.0 | 20.0 | 20.0 | 20.0 |
| Distance L2 between intersection point P3 and intersection point P4 (mm) | 10.0 | 10.0 | 10.0 | 10.0 | 10.0 | 10.0 | 10.0 | 10.0 | 10.0 |
| Distance L3 between intersection point P5 and intersection point P6 (mm) | 25.0 | 15.0 | 20.0 | 20.0 | 20.0 | 20.0 | 25.0 | 25.0 | 25.0 |
| Distance L4 between intersection point P7 and intersection point P8 (mm) | 15.0 | 10.0 | 10.0 | 10.0 | 10.0 | 10.0 | 15.0 | 15.0 | 15.0 |
| Inclination angle θ1 of main inclined grooves (deg.) | 50.0 | 40.0 | 40.0 | 45.0 | 55.0 | 75.0 | 40.0 | 40.0 | 40.0 |
| Inclination angle θ2 of sub inclined grooves (deg.) | 35.0 | 25.0 | 25.0 | 30.0 | 45.0 | 75.0 | 25.0 | 25.0 | 25.0 |
| Inclination angle θ3 of inner first vertical grooves (deg.) | 10.0 | 10.0 | 15.0 | 15.0 | 15.0 | 15.0 | 25.0 | 35.0 | 10.0 |
| Inclination angle θ4 of outer first vertical grooves (deg.) | 15.0 | 15.0 | 20.0 | 20.0 | 20.0 | 15.0 | 25.0 | 35.0 | 15.0 |
| The presence or absence of tie bars between shoulder blocks and middle blocks | Present | Present | Present | Present | Present | Present | Present | Present | Absent |
| On-snow performance (score) | 106 | 106 | 108 | 106 | 105 | 104 | 107 | 106 | 105 |
| On-ice performance (score) | 103 | 104 | 103 | 102 | 102 | 102 | 103 | 102 | 103 |

As the results of the test, it has been revealed that the tire for winter of the present invention ensured on-snow performance and on-ice performance in a high degree.

The invention claimed is:

1. A tire for winter comprising:
a tread portion being provided with
a plurality of first main inclined grooves extending obliquely from a first tread edge toward a tire equator and terminating at first inner ends beyond the tire equator without reaching a second tread edge, wherein the plurality of first main inclined grooves has an arc shape in which an inclination angle relative to an axial direction of the tire decreases continuously from the first inner ends to the first tread edge without increasing from the inner ends to the first tread edge,
a first sub inclined groove provided between the first main inclined grooves, the first sub inclined groove extending obliquely from the first tread edge toward the tire equator in the same direction as the first main inclined grooves and terminating not beyond the tire equator,
a plurality of second main inclined grooves extending obliquely from the second tread edge toward the tire equator in an opposite direction to the first main inclined grooves and terminating at second inner ends beyond the tire equator without reaching the first tread edge, wherein the plurality of second main inclined grooves has an arc shape in which an inclination angle relative to the axial direction of the tire decreases continuously from the second inner ends to the second tread edge without increasing from the inner ends to the first tread edge,
a second sub inclined groove provided between the second main inclined grooves, the second sub inclined groove extending obliquely from the second tread edge toward the tire equator in the same direction as the second main inclined grooves and terminates not beyond the tire equator,
a plurality of first longitudinal grooves dividing first land portions formed between the first main inclined grooves,
wherein the plurality of first longitudinal grooves arranged between adjacent first main inclined grooves comprises
at least one axially outer first longitudinal groove that is inclined in a same direction as the plurality of first main inclined grooves and that connects adjacent first main inclined grooves, and
at least one axially inner first longitudinal groove that is inclined in a same direction as the plurality of first main inclined grooves and that connects one of the adjacent first main inclined grooves and one second main inclined groove extending between the adjacent first main inclined grooves, and
a plurality of second longitudinal grooves dividing second land portions formed between the second main inclined grooves and inclining in the same direction as the second main inclined grooves,
wherein the first inner ends terminate at the intersection with the second main inclined grooves, the second inner ends terminate at the intersection with the first main inclined grooves, and
the first main inclined grooves and the second main inclined grooves are alternately provided in a circumferential direction of the tire.

2. The tire for winter according to claim 1,
wherein the first inner ends terminate in communication with the second main inclined grooves, the second inner ends terminate in communication with the first main inclined grooves, and the first main inclined grooves and the second main inclined grooves are alternately provided in a circumferential direction of the tire.

3. The tire for winter according to claim 1,
wherein the first longitudinal grooves adjacent through the first main inclined grooves communicate with the first main inclined grooves at different positions in the axial direction of the tire.

4. The tire for winter according to claim 1,
wherein the first longitudinal grooves comprise inner first longitudinal grooves and outer first longitudinal grooves disposed axially outward of the inner first longitudinal grooves.

5. The tire for winter according to claim 4,
wherein the first sub inclined grooves terminate beyond the inner first longitudinal groove.

6. The tire for winter according to claim 1,
wherein the second longitudinal grooves adjacent through the second main inclined grooves communicate with the second main inclined grooves at different positions in the axial direction of the tire.

7. The tire for winter according to claim 1,
wherein the second longitudinal grooves comprise inner second longitudinal grooves and outer second longitudinal grooves disposed axially outward of the inner second longitudinal grooves.

8. The tire for winter according to claim 7,
wherein the second sub inclined grooves terminate beyond the inner second longitudinal grooves.

9. The tire for winter according to claim 1,
wherein the tread portion comprises a plurality of grooves and a plurality of blocks defined by the grooves, and at least one of the blocks is provided with a stud pin or a hole for a stud pin.

10. The tire for winter according to claim 9,
wherein the blocks comprise a plurality of central blocks provided on the tire equator, and at least one of the central blocks is provided with the stud pin or the hole.

11. The tire for winter according to claim 9,
wherein the blocks comprise a plurality of shoulder blocks provided on the sides nearest the tread edges, and the shoulder blocks adjacent in the circumferential direction of the tire are different width in the axial direction of the tire.

12. The tire for winter according to claim 11,
wherein the shoulder blocks have an axial edge extending in a zigzag manner in the axial direction of the tire.

13. The tire for winter according to claim 9,
wherein the first longitudinal grooves and the second longitudinal grooves have tie bars with bulging groove bottoms, and the stud pin or the hole is provided at only one of the blocks in a pair positioned on the both sides of the tie bars in the axial direction of the tire.

14. The tire for winter according to claim 1,
wherein the plurality of first longitudinal grooves arranged between adjacent first main inclined grooves comprises at least one first longitudinal groove that connects the adjacent first main inclined grooves.

15. The tire for winter according to claim 14,
wherein the plurality of first longitudinal grooves arranged between adjacent first main inclined grooves comprises at least one first longitudinal groove that connects one of the adjacent first main inclined grooves and one second main inclined groove extending between the adjacent first main inclined grooves.

16. The tire for winter according to claim 1,
wherein the plurality of second longitudinal grooves arranged between adjacent second main inclined grooves comprises at least one second longitudinal groove that connects the adjacent second main inclined grooves.

17. The tire for winter according to claim 16,
wherein the plurality of second longitudinal grooves arranged between adjacent second main inclined grooves comprises at least one second longitudinal groove that connects one of the adjacent second main inclined grooves and one first main inclined groove extending between the adjacent second main inclined grooves.

18. The tire for winter according to claim 1,
wherein only one first sub inclined groove is provided between adjacent first main inclined grooves.

* * * * *